United States Patent
Masunaga et al.

(10) Patent No.: US 10,509,545 B2
(45) Date of Patent: Dec. 17, 2019

(54) BROWSING CONTROL SYSTEM AND BROWSING DEVICE

(71) Applicant: FUJI XEROX CO., LTD., Tokyo (JP)

(72) Inventors: Shohei Masunaga, Kanagawa (JP); Hirohito Shibata, Kanagawa (JP); Xingya Xu, Jiangsu (CN)

(73) Assignee: FUJI XEROX CO., LTD., Tokyo (JP)

( * ) Notice: Subject to any disclaimer, the term of this patent is extended or adjusted under 35 U.S.C. 154(b) by 203 days.

(21) Appl. No.: 15/648,466

(22) Filed: Jul. 13, 2017

(65) Prior Publication Data

US 2018/0157389 A1 Jun. 7, 2018

(30) Foreign Application Priority Data

Dec. 5, 2016 (JP) ................. 2016-235914

(51) Int. Cl.
- *G06F 3/0483* (2013.01)
- *G06F 3/03* (2006.01)
- *G06K 7/14* (2006.01)
- *G06K 7/10* (2006.01)
- *B42D 1/00* (2006.01)
- *G06F 3/01* (2006.01)

(52) U.S. Cl.
CPC ........... *G06F 3/0483* (2013.01); *B42D 1/009* (2013.01); *G06F 3/017* (2013.01); *G06F 3/0304* (2013.01); *G06K 7/10722* (2013.01); *G06K 7/1417* (2013.01)

(58) Field of Classification Search
CPC ........... G06F 3/0483; G06F 3/03; G06K 7/14; G06K 7/10; B42D 1/00
See application file for complete search history.

(56) References Cited

U.S. PATENT DOCUMENTS

| 9,678,633 B2 | 6/2017 | Fujimoto | |
| 2012/0311438 A1* | 12/2012 | Cranfill | G06Q 20/123 715/256 |
| 2013/0168954 A1* | 7/2013 | Koren | G09B 5/062 281/15.1 |

(Continued)

FOREIGN PATENT DOCUMENTS

| JP | 2003-150599 | 5/2003 |
| JP | 2013-196312 | 9/2013 |

(Continued)

OTHER PUBLICATIONS watanabe et al., "Bookisheet: Bendable device for browsing content using the metaphor of leafing through the pages" with English brief explanation, In Proc. UbiComp '08, ACM Press (2008), pp. 360-369.

(Continued)

*Primary Examiner* — Shaheda A Abdin
(74) *Attorney, Agent, or Firm* — JCIPRNET (57) ABSTRACT

A browsing control system includes a booklet that is acquired by binding a number of sheets, a specification unit that specifies a page number of a page opened in the booklet, and a controller that controls page turning of an electronic document depending on a difference between a page number specified by the specification unit before the page of the booklet is turned and a page number specified by the specification unit after the page thereof is turned.

19 Claims, 10 Drawing Sheets

(56) References Cited

U.S. PATENT DOCUMENTS

2013/0232439 A1* 9/2013 Lee ...................... G06F 3/0488
715/776

FOREIGN PATENT DOCUMENTS

| JP | 2014-126898 | 7/2014 |
| JP | 2015-111397 | 6/2015 |

OTHER PUBLICATIONS

Izawa et al., "A Proposal of New Interactions with Directly-manipulable Mekuri Interface" with English brief explanation, Interaction 2011 papers, (2011), pp. 1-8.
Kidokoro et al., "Paranga: A Book-shaped Device Reproducing Page-flipping Sensation" with English brief explanation, Interaction 2011 papers, (2011), pp. 1-4.

* cited by examiner

| TIME | DETECTED PAGE NUMBER |
|---|---|
| 234100 | 6 |
| 234200 | (UNDETECTED) |
| 234300 | 6 |
| 234400 | (UNDETECTED) |
| 234500 | 7 |
| 234600 | 7 |
| ... | ... |

FIG. 6

| TIME | PAGE NUMBER |
|---|---|
| 234100 | 6 |
| 234500 | 7 |
| 235300 | 51 |
| ... | ... |

BROWSING CONTROL SYSTEM AND BROWSING DEVICE

CROSS-REFERENCE TO RELATED APPLICATIONS

This application is based on and claims priority under 35 USC 119 from Japanese Patent Application No. 2016-235914 filed Dec. 5, 2016.

BACKGROUND (i) Technical Field

An exemplary embodiment of the invention relates to a browsing control system and a browsing device.

(ii) Related Art

Various user interfaces (UI) that use a page turning metaphor of a paper book have been suggested as the UI for turning a page of an electronic book.

SUMMARY

In a method of reading page identification information on an opened page opened in a browsing operation paper book by a camera and displaying the page within the electronic document being browsed which is indicated by the page identification information on a screen, the operation paper book needs to have the number of pages which is equal to or greater than the number of pages of the electronic document which is an operation target. In a case where the number of pages of the operation paper book is less than the number of pages of the electronic document, it is not difficult to designate and display the page of the electronic document having the page number that exceeds the number of pages of the paper book.

According to an aspect of the present invention, there is provided a browsing control system including: a booklet that is acquired by binding a number of sheets; a specification unit that specifies a page number of a page opened in the booklet; and a controller that controls page turning of an electronic document depending on a difference between a page number specified by the specification unit before the page of the booklet is turned and a page number specified by the specification unit after the page thereof is turned.

BRIEF DESCRIPTION OF THE DRAWINGS

Exemplary embodiment(s) of the present invention will be described in detail based on the following figures, wherein.

DETAILED DESCRIPTION

Figure 1:
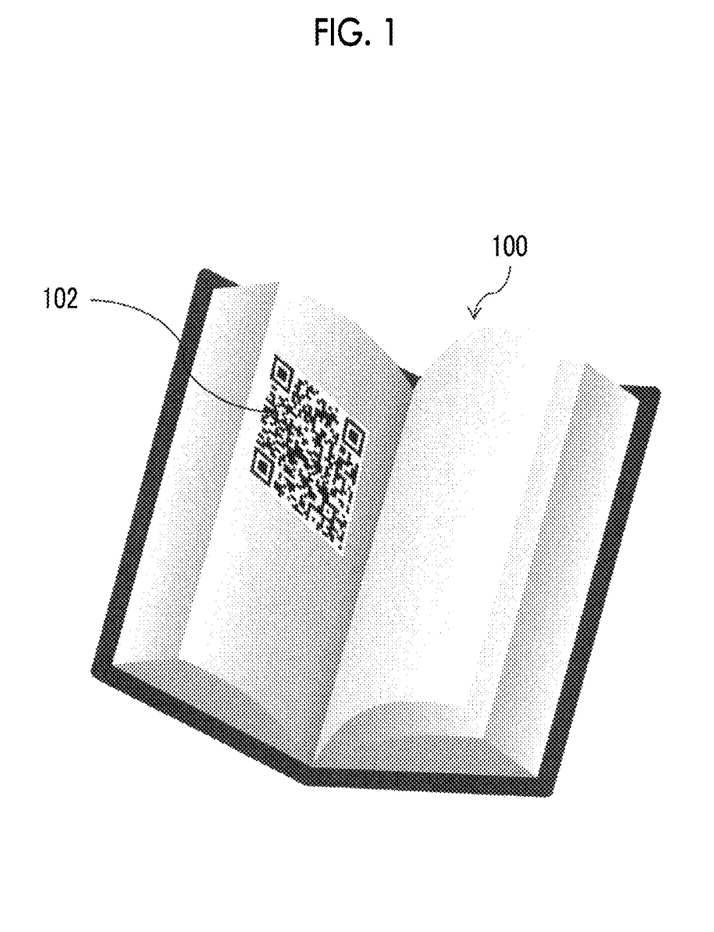
FIG. 1 is a schematic diagram showing an external appearance of an illustrative operation booklet.

In the present exemplary embodiment, a booklet (hereinafter, referred to as an operation booklet 100) acquired by binding multiple sheets like a book shown in FIG. 1 is used as one element constituting a system for a page turning operation of an electronic document such as an electronic book. The operation booklet 100 is a page turning tool common to multiple different electronic documents.

An image code 102 including information of a page number of at least one page of two pages is printed for every two facing pages of the operation booklet 100. For example, the image code 102 may use an image code format such as a QR code (registered trademark) or a barcode. The page numbers indicated by the image code 102 are consecutive numbers of pages of the operation booklet 100. Since the operation booklet 100 is a tool for a page turning operation, the image code 102 may be represented on the page, and information or an image used by a user may be printed on the page. For example, in a case where a diary is used as the operation booklet 100, information of a date or a ruled line of the diary and the image code 102 indicating the page number are printed on each page.

In the present exemplary embodiment, the user instructs the system to turn the page of the electronic document by turning the page of the operation booklet 100. The system reads the image code 102 of the page opened by the user by using a camera, and recognizes the page number of the page. The page of the electronic document is turned depending on a difference between the page numbers before and after the page turning operation of the user.

For example, the camera that reads the image code 102 may be attached to a head-mounted display (HMD) that displays the electronic document.

Figure 2:
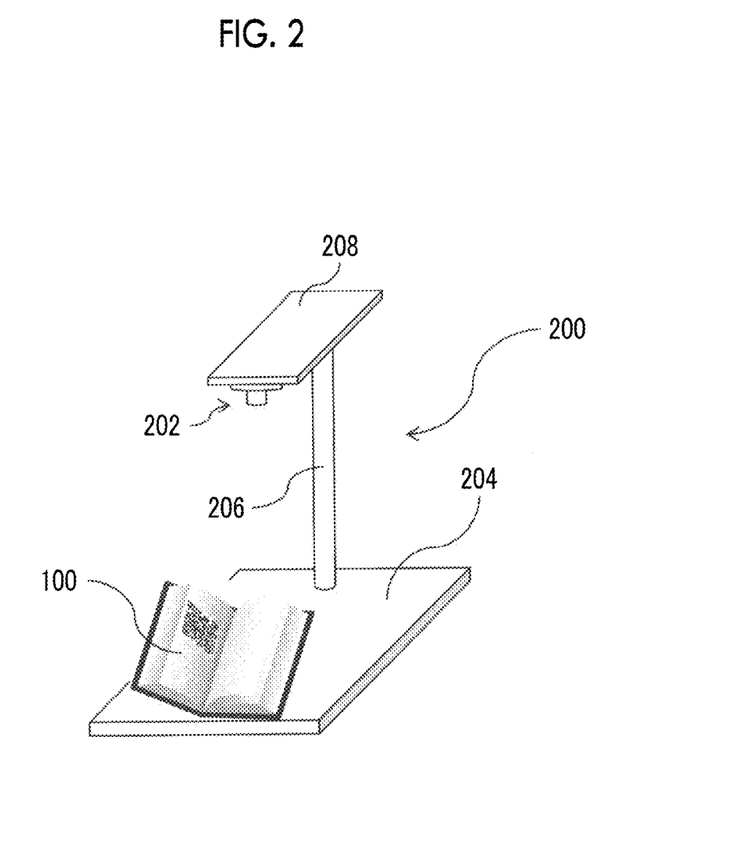
FIG. 2 is a schematic perspective diagram of an illustrative operation stand including a camera that captures an image code printed on a page of the operation booklet.
Figure 3:
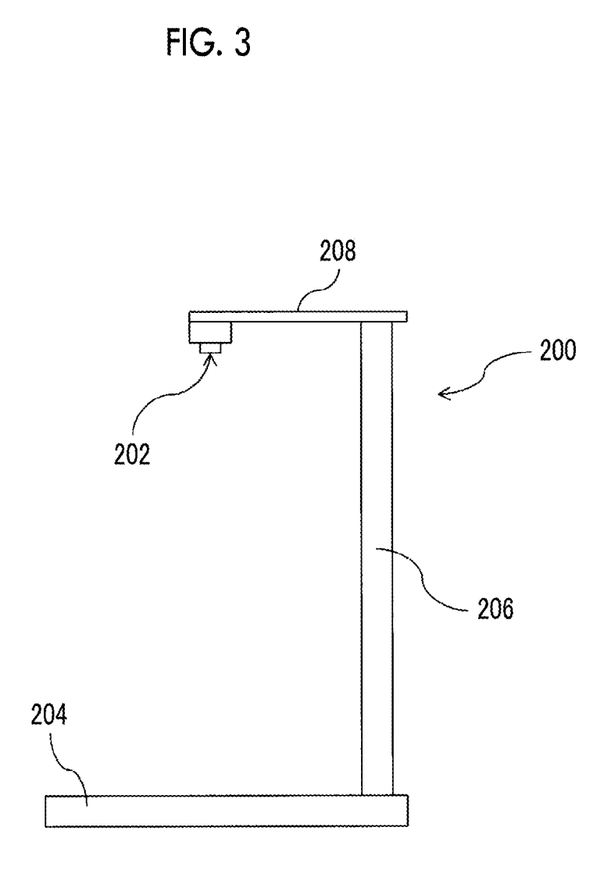
FIG. 3 is a schematic side view of the illustrative operation stand.

As another example, the page of the operation booklet 100 on which the image code 102 is printed may be captured by a camera 202 provided in an operation stand 200, as shown in FIGS. 2 and 3. FIG. 2 is a perspective view of the operation stand 200, and FIG. 3 is a side view (both are schematic diagrams). The illustrated operation stand 200 includes a base panel 204, a support 206 fixed on an upper surface of the base panel 204 in a upright state, and a support arm 208 that extends an upper end of the support 206 in a horizontal direction. The operation stand 200 is provided on an upper surface of a desk or a table with the base panel 204 as a bottom. The camera 202 is supported near a front end of the support arm 208, and is positioned above a central portion of the base panel 204. The camera 202 fits the entire base panel 204 (particularly, a wide portion in front of the support 206) in the field of view. In other words, if the user may widen the operation booklet 100 on the base panel 204, the opened page of the operation booklet 100 is captured by the camera 202.

Figure 4:
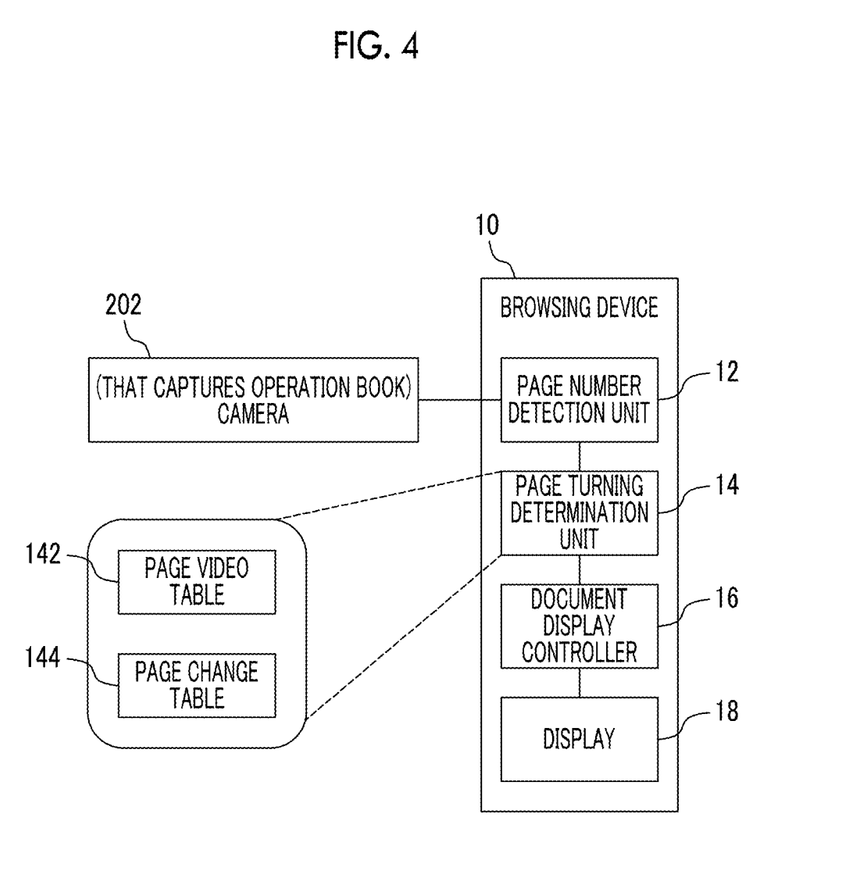
FIG. 4 is a diagram showing an example of a functional configuration of a system for controlling page turning of an electronic document using the operation booklet.

FIG. 4 shows a functional configuration of the system according to the exemplary embodiment. The system includes the camera 202, and a browsing device 10 connected to the camera 202 so as to communicate with each other in a wireless or wired manner.

The camera 202 captures the field of view for every capturing time arriving at predetermined time intervals, and transmits the acquired images to the browsing device 10. For example, the camera 202 may be a video camera that captures a video.

For example, the browsing device 10 is realized by causing a computer included in a personal computer, a tablet terminal, or an electronic book terminal to execute programs indicating functions of a page number detection unit 12, a page turning determination unit 14, and a document display controller 16. For example, a display 18 included in the browsing device 10 may be a HMD.

In the browsing device 10, the page number detection unit 12 recognizes the page number indicated by the image code 102 from the image which is captured by the camera 202 and is transmitted whenever the capturing time arrives. The page turning determination unit 14 acquires the number of pages of the operation booklet 100 turned by the user with a temporal change of the page numbers recognized by the page number detection unit 12 from the images in the capturing times (a negative value in a case where the page number after the page is turned is smaller than the page number before the page is turned). The page turning determination unit 14 uses a page video table 142 and a page change table 144 (both are described below) in order to calculate the number of turned pages. The page turning determination unit 14 calculates the number of pages to be turned in the electronic document corresponding to the number of pages.

The document display controller 16 performs display control of the electronic document. In the present exemplary embodiment, the document display controller 16 turns the page displayed on the display 18 according to the number of pages to be turned which is calculated by the page turning determination unit 14 (that is, a page acquired by turning pages forward or backward as many as the number of pages to be turned from the page displayed until then is displayed on the display 18).

Figure 5:
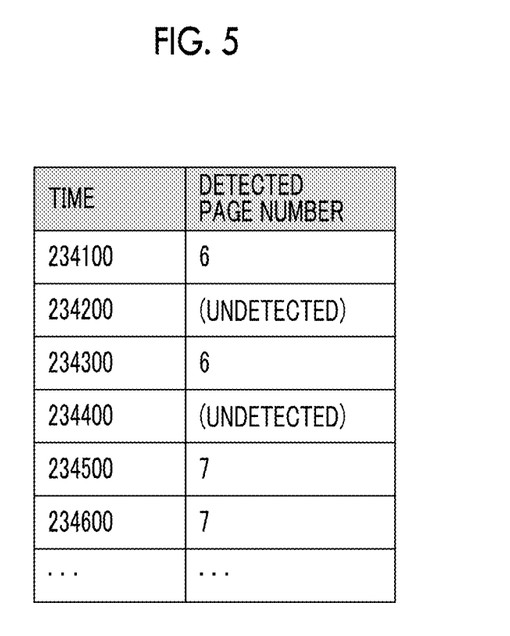
FIG. 5 is a diagram showing an example of a data content of a page video table.

FIG. 5 shows an example of data content of the page video table 142. The capturing times (item "time" in the drawing) of the images captured by the camera 202 on a regular basis and the page numbers detected by the page number detection unit 12 from the images are recorded in elements of the page video table 142. In the illustrated example, the capturing times are represented in milliseconds. In this example, a capturing interval is 100 milliseconds. The page number detection unit 12 is not able to detect the page number from the image in a case where the operation booklet 100 is outside the field of view of the camera 202 or in a case where the image code 102 is not clearly caught by the camera 202 since the operation booklet is closed or an angle of the opened page with respect to the camera 202 is bad (that is, the image code 102 is not able to be recognized from the captured image) even though the operation booklet is within the field of view. In such a case, predetermined values (described as "undetected" in the drawing) indicating that the page number is not able to be detected are recorded in items of the page numbers corresponding to the capturing times.

The system according to the exemplary embodiment has two modes such as a "navigation mode" and a "non-navigation mode". The navigation mode is a mode in which the user turns the page of the operation booklet 100, and thus, the system turns the page of the electronic document. In contrast, the non-navigation mode is a mode in which even though the user turns the page of the operation booklet 100, the system does not turn the page of the electronic document. If the system is configured such that the user turns the page of the operation booklet 100, and thus, the system necessarily turns the page of the electronic document, since there are some cases where it is inconvenient, the non-navigation mode is prepared. For example, it is considered that even though the user turns the last page of the operation booklet 100, the system turns, up to only the middle page of the electronic document. In this case, it is considered that the opened page of the operation booklet 100 is turned backward to the previous page once and then is turned again, and thus, the electronic document is turned up to the later page. However, in a case where the system has only the navigation mode, if the user turns the page backward, the system also turns the page of the electronic document backward, and thus, the page is not able to be turned forward. In contrast, if the page of the operation booklet is turned backward after the system is switched to the non-navigation mode, such a problem is addressed.

In the present exemplary embodiment, if the page number is not continuously detected for a predetermined period (referred to as a "threshold period") or longer in the navigation mode, the system is switched to the non-navigation mode. The page video table 142 is used for switching the system from the navigation mode to the non-navigation mode. For example, in a case where the capturing interval of the camera 202 is 100 milliseconds as in the example of FIG. 5 and the threshold period is 1 second, since the page video table 142 may suffice to describe information items of the capturing times up to one second ago from the current time, the page video table 142 may suffice to describe 10 entries of the capturing times. The page number detection unit 12 detects the page number, and thus, the system is switched from the non-navigation mode to the navigation mode.

Figure 6:
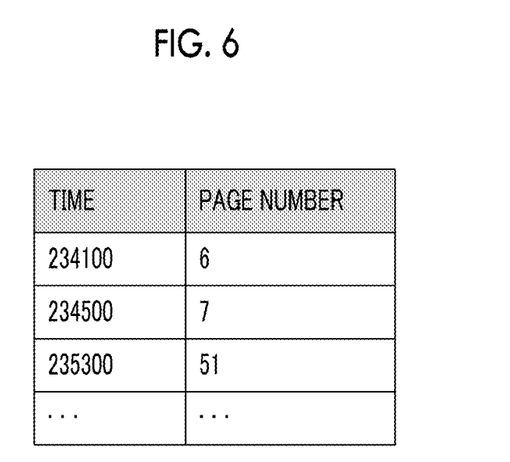
FIG. 6 is a diagram showing an example of a data content of a page change table.

FIG. 6 shows an example of the page change table 144. In a case where the page number detected by the page number detection unit 12 is changed from the page number detected in a previous stage, a time when the page number is changed and the changed page number in this time are recorded in the page change table 144. Accordingly, the element included in the page change table 144 necessarily includes the page number (that is, there is no item of "undetected"), and a value of the page number of each entry is necessarily different from a value of the page number of the entry which is temporally earlier than each entry. If the mode of the system is switched from the navigation mode to the non-navigation mode, the page change table 144 is cleared (that is, all the entries are removed, and the number of entries is 0).

An example of a process procedure of the page number detection unit 12 will be described with reference to FIG. 7.

The page number detection unit 12 acquires a new image from the camera 202, and thus, this process is started. In this case, the page number detection unit 12 adds the entry of the acquired image to the end of the page video table 142 (S10). In this case, it is assumed that the added entry is called a current entry E. In this time, a time when the image is acquired is recorded in an item of "time" of the current element E. Subsequently, the page number detection unit 12 determines whether or not the number of entries of the page video table 142 exceeds a predetermined upper limit (S12), and removes the entry (the entry of which the "time" is the oldest) of the head of the page video table 142 (S14). In a case where it is determined that the number of entries of the page video table 142 is equal to or less than the upper limit in S12, the page number detection unit 12 skips S14.

Subsequently, the page number detection unit 12 detects the image code 102 from the acquired image, and decodes the image code 102 to recognize the page number (S16). It is determined whether or not the page number is recognized in S16 (S18). In a case where the image code 102 is not able to be detected from the acquired image, the page number is not recognized, and the determination result of S18 is No. In a case where the determination result of S18 is No, the process proceeds to the procedure (to be described below) shown in FIG. 8.

In a case where the determination result of S18 is Yes, the page number detection unit 12 records the recognized page number in an item of "detected page number" of the current element E of the page video table 142 (S20).

Figure 9:
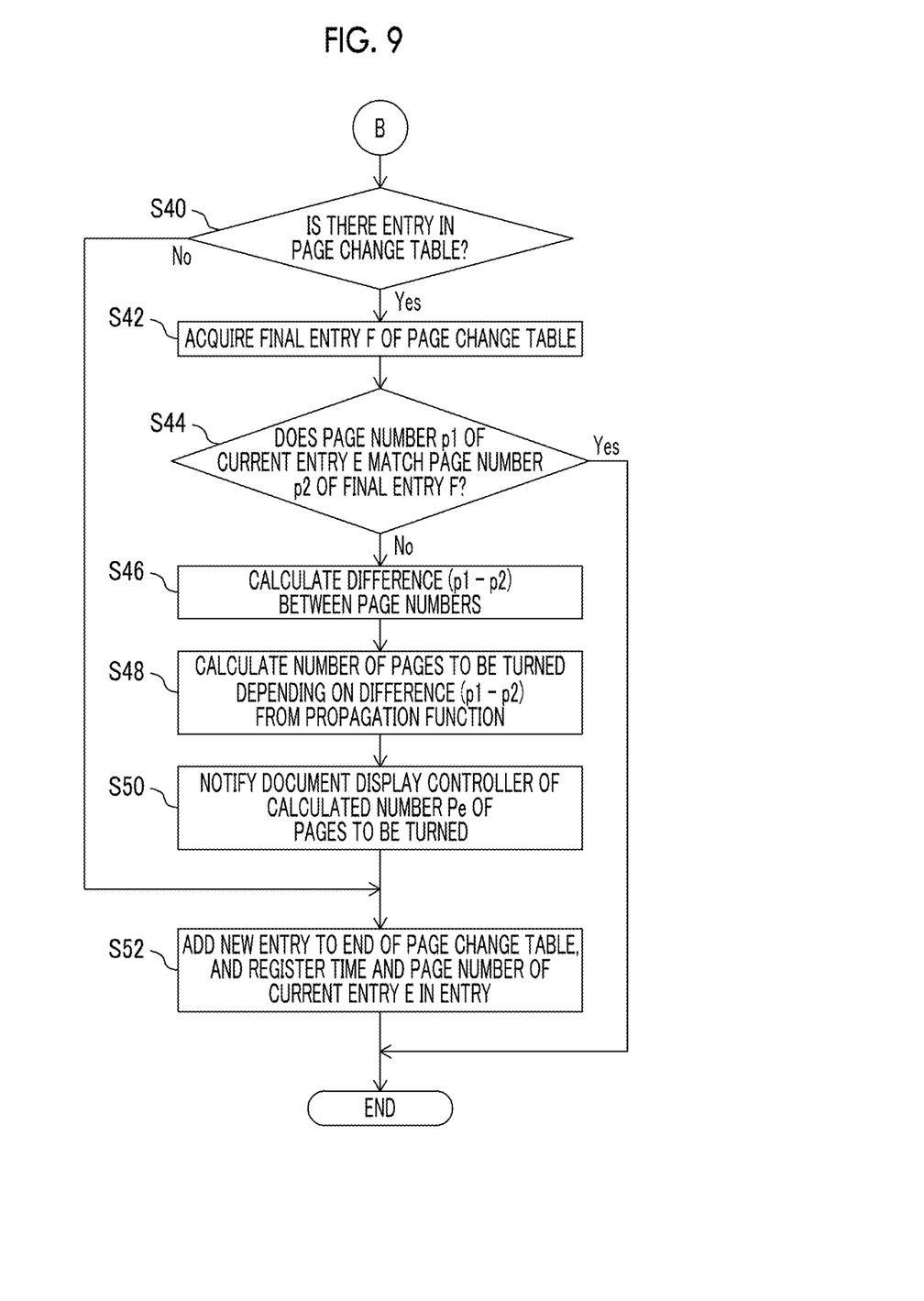
FIG. 9 is a diagram showing an example of a process procedure of a page turning determination unit.

Subsequently, the page number detection unit 12 determines whether or not the current operation mode of the browsing device 10 is the non-navigation mode (S22), and switches the operation mode to the navigation mode if the determination result is Yes (S24). In a case where the determination result of S22 is No (the current mode is the navigation mode), S24 is skipped. Thereafter, the procedure (to be described below) shown in FIG. 9 is performed by the page turning determination unit 14.

Figure 7:
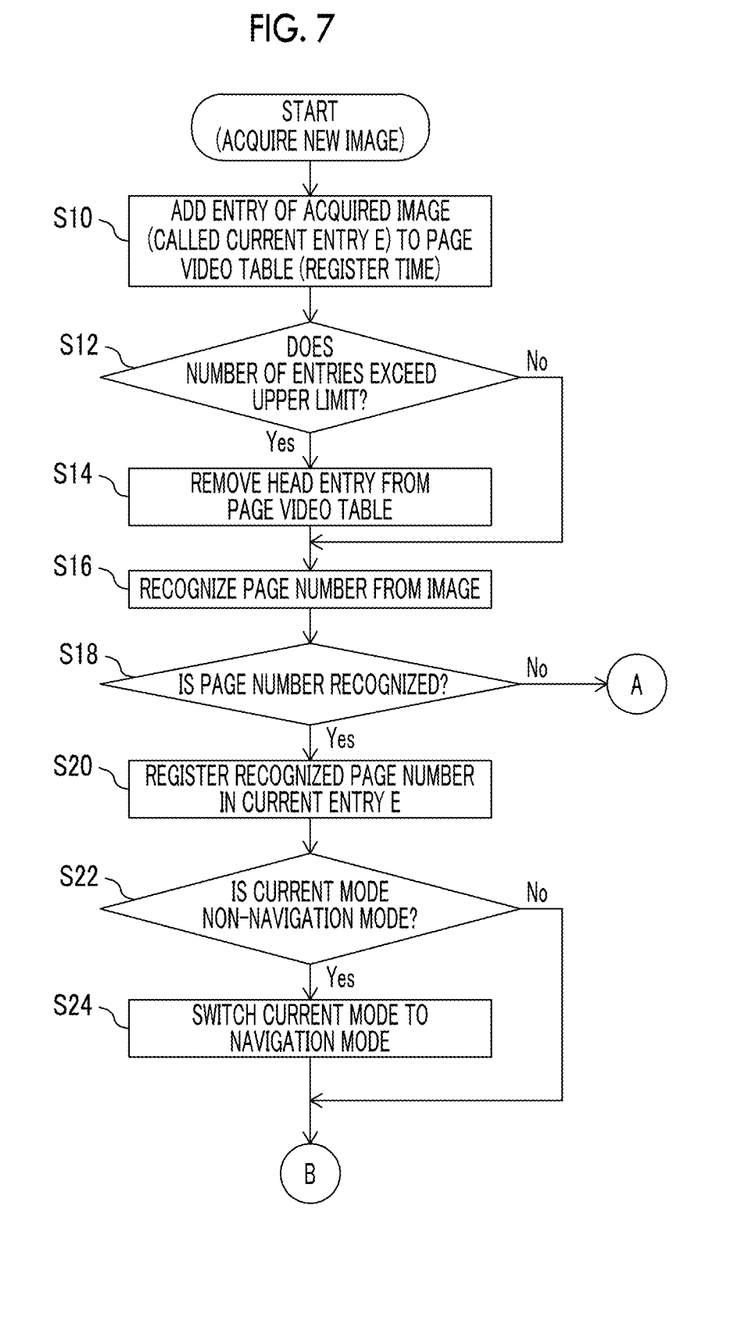
FIG. 7 is a diagram showing a principal part of an example of a process procedure of a page number detection unit.

In the procedure of FIG. 7, since a portion including S12 and S14, a portion including S16 to S20, and a portion including S22 and S24 do not have the dependency relationship, these steps may be performed in an arbitrary order.

Hereinafter, an example of the process of the page number detection unit 12 in a case where it is determined that the page number is not able to be recognized in S18 will be described with reference to FIG. 8.

In this example, the page number detection unit 12 determines whether or not the current operation mode is the navigation mode (S26). In a case where the determination result is No (the current mode is the non-navigation mode), the process is ended without performing any process.

Meanwhile, in a case where the determination result is Yes, the page number detection unit 12 scans an entry group in the page video table 142 in a reverse direction in time with the current entry E as a starting point (S28), and determines whether or not a ("undetected") state in which the page number is not detected is continued for a predetermined determination period or longer (S30). In a case where the determination result is Yes, the page number detection unit 12 changes the operation mode to the non-navigation mode, and clears the page change table 144 (that is, removes all the entries) (S32). In a case where the determination result of S30 is No, S32 is skipped, and the process is ended.

Hereinafter, an example of a process procedure of the page turning determination unit 14 will be described with reference to FIG. 9.

In the procedure, the page turning determination unit 14 determines whether or not there is the entry in the page change table 144 (S40).

Figure 8:
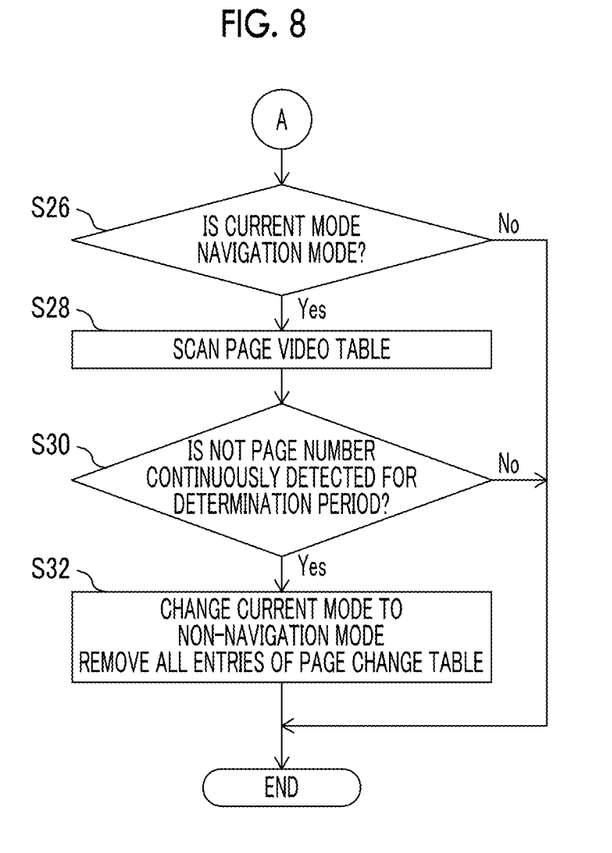
FIG. 8 is a diagram showing a remaining portion of the example of the process procedure of the page number detection unit.

In a case where the determination result is No, the current operation mode of the browsing device 10 is the non-navigation mode (see S32 of FIG. 8). In this case, the page turning determination unit 14 adds a new entry to the end of the page change table 144 (S52). Since the page change table 144 before the new entry is added is empty, the new entry is eventually added to the head of the page change table 144 in S52. The page turning determination unit 14 records the time and the page number of the current entry E in items of "time" and "page number" of the new entry for the new entry (S52). In a case where the determination result of S40 is No, the new entry added to the page change table 144 in S52 indicates the page number detected in a time when the system is switched from the non-navigation mode to the navigation mode. The page number is the page number which is initially detected in the navigation mode to be subsequently continued, and is called a "start page". The start page is an initial entry of the page change table 144.

In a case where the determination result of S40 is Yes, the page turning determination unit 14 acquires the entry (that is, the entry of which the time is the newest) of the end from the page change table 144 (S42). It is assumed that this entry is called a final entry F. Subsequently, the page turning determination unit 14 determines whether or not a page number p1 of the current entry E matches a page number p2 of the final entry F (S44).

In a case where the determination result of S44 is No, if the user turns the page of the operation booklet 100, and thus, the page (p1) different from the page (p2) opened in a time of the final entry F is opened in the current time. In this case, the page turning determination unit 14 calculates a difference (p1−p2) between the page numbers (S46). In a case where the page number p1 after the page is turned is smaller than the page number p2 before the page is turned, the difference (p1−p2) is a negative value.

Subsequently, the page turning determination unit 14 calculates the number Pe of pages to be turned in the electronic document being displayed from the difference (p1−p2) (S48). The number Pe of pages to be turned is roughly in proportion to the different (p1−p2), and the number Pe of pages to be turned is also a negative value in a case where the difference (p1−p2) is the negative value.

A propagation function is used for calculating the number Pe of pages to be turned from the difference (p1−p2). If the difference (p1−p2) is input, the propagation function is a function that outputs the number Pe of pages to be turned corresponding to the difference. An implementation form of the propagation function is not particularly limited. For example, a table that stores the number of pages to be turned corresponding to a value of the difference (p1−p2) for each value of the difference may be used as the propagation function. As another example, the propagation function may be implemented in the form of a program indicating an expression for calculating the number of pages to be turned from the difference (p1−p2).

Examples of the propagation function are shown as follows.

(a) A propagation function that outputs the value of the input difference (p1−p2) as the number Pe of pages to be turned with no change may be used. That is, Pe=(p1−p2). In a case where this propagation function is used, if the total number of pages of the operation booklet 100 is smaller than the total number of pages of the electronic document, even though the user turns all the pages of the operation booklet 100, the system does not turn the page of the electronic document to the final page. In this case, the operation booklet 100 is removed from the field of view of the camera, and the system is switched to the non-navigation mode. Subsequently, after the page of the operation booklet 100 is turned in a reverse direction (that is, a direction in which the page number becomes smaller) in the non-navigation mode, the page of the electronic document may be further turned in a forward direction if the system is switched to the navigation mode again. Since the page turning of the operation booklet 100 is not reflected on the electronic document in the non-navigation mode, the page turning state of the operation booklet 100 may be reset in this state.

(b) A propagation function that satisfies Pe=k(p1−p2) may be used. Here, k is a positive real number other than 1. If k is a value greater than 1, even though the operation booklet 100 is not reset by switching the system to the non-navigation mode during browsing as stated above, the page of the electronic document to may be turned to the page number greater than the total number of pages of the operation booklet 100. If k is a value less than 1, the turning of a subtle number of pages of the electronic document may be controlled. For example, the control performed such that k is set to be 0.5 and the page of the electronic document is turned by 0.5 page by turning the page of the operation booklet 100 by one page is an example. For example, control may be performed such that a display range of the electronic document is moved by a predetermined number of lines by turning the page of the operation booklet 100 by one page (in this case, k=predetermined number of lines/total number of lines of one page), and such control is included in the scope of the page turning control of the electronic document. A unit of the movement amount of the display range per page which is the number (the difference) of pages turned in the operation booklet 100 is not limited to the number of lines. For example, as in a case where the pages are moved by 0.2 page, a percentage of the lines on one page may be used as the unit. The user may set or change the value of k or the movement amount of the display range per page which is the number of pages turned in the operation booklet 100.

(c) As a modification of the above (b), k may be used as a ratio between the total number of pages of the operation booklet 100 and the total number of pages of the electronic document. That is, k=(total number of pages of electronic document)/(total number of pages of operation booklet 100). In so doing, even though the operation booklet 100 is not reset by switching the system to the non-navigation mode during browsing as stated above, the page of the electronic document may be turned to the final page by turning the page of the operation booklet 100 with one round. Since it may be assumed for the browsing device 10 which is a constituent element of the system that the total number of pages of the operation booklet 100 which is another constituent element is known, the browsing device 10 may calculate k from the total number of pages of the operation booklet and the total number of pages of the electronic document opened by the user who wants to view. Even in the case where the electronic document is a reflow type (that is, a type in which the page is determined by planning the layout of the document with a font size designated for a display area without having a fixed page), the total number of pages of the electronic document is acquired from information items such as a size of the display area and the font size.

(d) As the generalization of the above (c), a function that maps the total number of pages (that is, a maximum value of the difference (p1−p2)) of the operation booklet 100 to the number of pages which is equal to or greater than the total number of pages (that is, a maximum value of the number Pe of pages to be turned) of the electronic document may be used as the propagation function. In this case, even though the operation booklet 100 is not reset by switching the system to the non-navigation mode during browsing as stated above, the page of the electronic document may be turned to the final page by turning the page of the operation booklet 100 with one round.

(d-1) The propagation function in the meaning of (d) may be a function of which a slope monotonically increases (that is, does not monotonically decrease) as the page difference (p1−p2) which is a variable becomes greater (the "slope" is a differential of the variable (p1−p2) of Pe). For example, Pe=q(p1−p2)$^r$ (q is a positive real number, and r is a real number greater than 1). As mentioned above, if the propagation function of which the slope monotonically increases is used, if the user turns a large number of pages in the operation booklet 100 while precisely turning pages of the electronic document as many as the number of pages close to the number of pages of the operation booklet in a range in which the number of pages turned in the operation booklet 100 is small, the number of pages to be turned in the electronic document may increase.

(d-1-1) As the propagation function in the meaning of (d-1), the propagation function may be a function which satisfies that Pe=(p1−p2) in a section in which the page difference (p1−p2) which is the variable is equal to or less than a threshold t (t is a positive integer) and is a function of which the slope monotonically increases as the variable (p1−p2) becomes greater in a section in which (p1−p2) is greater than the threshold t. This propagation function is one of the functions which is related to the difference (p1−p2) and monotonically increases. In a case where the propagation function is used, if the number (p1−p2) of pages turned in the operation booklet 100 is equal to or less than the threshold t, the number of pages to be turned in the electronic document may increase in a section in which the number (p1−p2) of pages turned in the operation booklet 100 exceeds the threshold t while pages of the electronic document as many as the number of pages of the operation booklet may be precisely turned, and thus, the page of the electronic document may be turned to the final page by turning the page of the operation booklet 100 with one round. Particularly, if the threshold t=1, both an operational feeling of being intuitively easy to be considerably understood like a case where the electronic document is turned by one page if the operation booklet 100 is turned by one page and a function of turning the page of the electronic document to the final page by turning the page of the operation booklet 100 with one round may be achieved.

(e) The propagation function of which the slope monotonically increases as the page difference (p1−p2) which is the variable becomes greater may be used. The propagation function is a function acquired by excluding a feature that maps the total number of pages of the operation booklet 100 to the number of pages which is equal to or greater than the total number of pages of the electronic document from the propagation function of the above (d-1). For example, Pe=q(p1−p2)$^r$ is an example of the propagation function (q is a positive real number and r is a real number greater than 1). Here, if q=1, the number Pe of pages to be turned in the electronic book as the number of pages turned in the operation booklet 100 may be set to be greater while turning the page of the electronic book by one page if the page of the operation booklet 100 is turned by one. An exponential function may be used instead of using the exponentiation of the difference in this manner. Instead of the exponentiation or the exponential function, a function acquired by expressing the relationship in which an absolute value of the number Pe of pages to be turned rapidly increases with respect to an absolute value of the difference (p1−p2) not that these absolute values are in proportion to each other, as a table, may be used as the propagation function.

(f) A propagation function which satisfies the number Pe of pages to be turned=(p1−p2) may be used in a section in which the page difference (p1−p2) which is the variable is equal to or less than the threshold t (t is a positive integer). In this function, if the number of pages of the operation booklet 100 turned by the user is equal to or less than t, pages of the electronic document as many as the number of pages are turned. In this propagation function, the number Pe of pages to be turned in the electronic document in a section in which the number (p1−p2) of pages turned in the operation booklet 100 is greater than the threshold t may be set to be greater than (p1−p2) (for example, Pe=k(p1−p2) (here, k>1) is an example thereof). If the number (difference) of pages turned in the operation booklet 100 is equal to or less than t, the propagation function provides an operation feeling of being intuitively easy to be understood like a case where the electronic book is turned by the same number of pages. If the propagation function satisfying that the number Pe of pages to be turned in the electronic document is greater than (p1−p2) is used in a section in which (p1−p2) is greater than the threshold t, in a case where the number of pages of the electronic document is greater than the number of pages of the operation booklet 100, the page of the electronic document to the final page may be turned by turning the page of the operation booklet 100 with one round, or the number of times the page turning state of the operation booklet 100 is reset may be set to be small in the non-navigation mode in order to turn at least the page of the electronic document to the final page. Particularly, if the threshold t=1, both an operational feeling of being intuitively easy to be considerably understood as in a case where the electronic document is turned by one page if the operation booklet 100 is turned by one page and a function of turning the page of the electronic document to the final page by turning the page of the operation booklet 100 with one round may be achieved. Even in a case where the user turns many pages in the booklet and thus, the system is not able to turn the page of the electronic document to a desired page, if the user precisely turns the page one by one (or the number of pages which is equal to or less than the threshold), the system may turn the page of the electronic document to a desired page.

(g) A propagation function of which the number Pe of pages to be turned in the electronic document becomes greater as a speed at which the page of the operation booklet 100 is turned becomes greater may be used. For example, this speed may be calculated by (p1−p2)/(time of current entry E−time of final entry F of page change table 144).

(h) The number of pages to be turned in the electronic document may be changed depending on the number of information items such as the number of characters of each page. For example, the number of characters corresponding to each page of the operation booklet 100 may be determined, and the display range of the electronic document may be changed (the page is turned forward or backward) by the number of characters corresponding to the number of pages (the difference) turned in the operation booklet 100.

Referring back to the description of the procedure of FIG. 9, if the number Pe of pages to be turned is calculated in S48, the page turning determination unit 14 notifies the document display controller 16 of the number Pe of pages to be turned (S50).

The document display controller 16 turns the page of the electronic document displayed on the screen according to the notified number Pe of pages to be turned. That is, it is assumed that (page number after page is turned)=(page number being current displayed)+(absolute value of Pe) if Pe is a positive value and (page number after page is turned)=(page number being current displayed)−(absolute value of Pe) if Pe is a negative value.

Here, as one variation, the document display controller 16 may change a display page of the electronic document only for a special page such as an even-numbered page, an odd-numbered page, or only a page including a diagram. For example, if a current display mode of the electronic document is a mode in which only the even-numbered page is displayed, the even-numbered page acquired by changing the page being currently displayed by the number Pe of pages to be turned is newly displayed. If the display mode is a mode in which only the page including the diagram is displayed, the page of the electronic document may be newly displayed by turning pages as many as the number Pe of pages to be turned from the page being currently displayed for only the page including the diagram. To achieve this, the document display controller 16 may include a list (in the case of a fixed layout type electronic document) of pages including the diagrams in the electronic document or a list of the diagrams itself (in the case of a page reflow type electronic document).

After S50, the page turning determination unit 14 adds a new entry to the end of the page change table 144, and records a time and a page number of a current entry E (see S10 of FIG. 7) in the new entry (S52). Accordingly, the process in a case where the user turns the page of the operation booklet 100 is ended.

In a case where the determination result of S44 is Yes, since the user does not turn the page of the operation booklet 100, the processes of S46 to S52 are skipped, and the process of FIG. 9 is ended.

Although not particularly mentioned in the above-described description, two facing pages are within the field of view of the user in a paper book, whereas the browsing device 10 may display only one page and may display two facing pages on the display 18. For example, a page of two facing pages of the operation booklet 100 which the user pays attention to may be detected if a field-of-view detection technology using the smartphone is used, but the cost of the system may increase. Here, as one example, it is assumed that the browsing device 10 displays two facing pages of the electronic document on the display 18. As another example, if the page displayed on the display 18 is set as one page and the user turns the operation booklet 100 by one sheet (that is, two pages are turned forward), the number (the difference) of pages turned in the operation booklet 100 may be calculated based on the number of sheets such that the display page of the electronic document is turned forward by one page.

The method of turning pages of the electronic document as many as the number Pe of pages to be turned depending on the number of pages (difference (p1−p2)) turned in the operation booklet 100 has been described above. It is assumed that this method is called a relative access method. In contrast, a method of displaying the page of the page number of the electronic document corresponding to the page number of the opened browsing book is called the absolute access method.

As a modification example of the above-described exemplary embodiment, the browsing device 10 may perform these methods while switching between the relative access method and the absolute access method according to an instruction from the user. For example, the instruction to switch these methods may be performed by allowing the user to do a specific gesture with their hand on the page (see FIG. 2) of the operation booklet 100 opened on the base panel 204 of the operation stand 200. As an example of such a gesture, for example, a finger-up gesture schematically shown in FIG. 10 may be used. The finger-up gesture is a gesture to slide a finger of a hand 300 from the bottom of the page to the top (that is, from the front to the back) at a predetermined distance. The finger-up gesture is merely an example, and another gesture capable of being recognized as a special gesture may be used.

Figure 11:
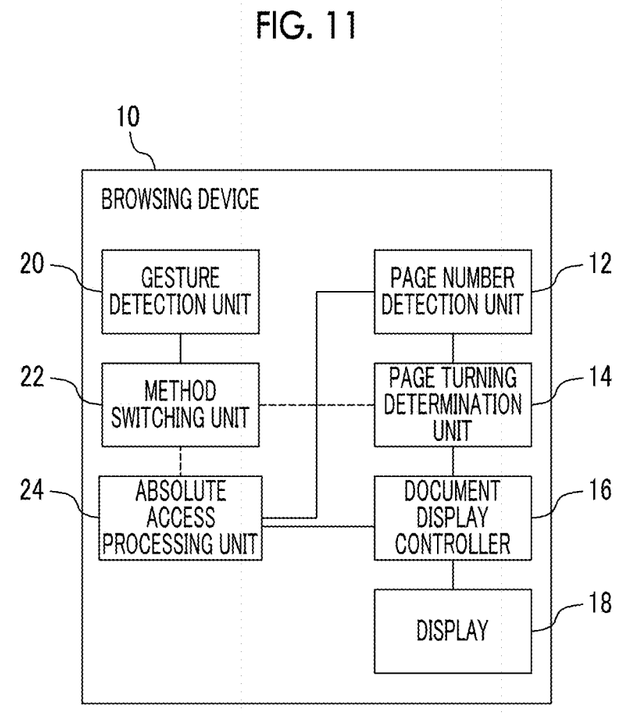
FIG. 11 is a diagram showing an example of a functional configuration of a browsing device having a function of switching the page turning method.

An example of a functional configuration of the browsing device 10 according to this modification example is illustrated in FIG. 11. In the browsing device 10 illustrated in the drawing, a gesture detection unit 20, a method switching unit 22, and an absolute access processing unit 24 are added to the configuration of the browsing device 10 according to the above-described exemplary embodiment shown in FIG. 4.

The gesture detection unit 20 detects a specific gesture indicating a method switching instruction from an image (moving image) sent from the camera 202 (see FIGS. 2 and 4) at every time interval by using a known gesture detection technology.

In a case where the gesture detection unit 20 detects the specific gesture, the method switching unit 22 switches the method of turning the page of the electronic document from the current method to the other method. For example, if the current method is the relative access method, the gesture is performed, and thus, the current mode is switched to the absolute access method.

The absolute access processing unit 24 controls the page turning in the absolute access method. That is, the absolute access processing unit 24 instructs the document display controller 16 to open the page having the page number p1 detected by the page number detection unit 12 on the electronic document. The absolute access processing unit 24 is operated exclusively of the page turning determination unit 14 (which is a relative access processing unit corresponding to the absolute access processing unit 24).

Figure 12:
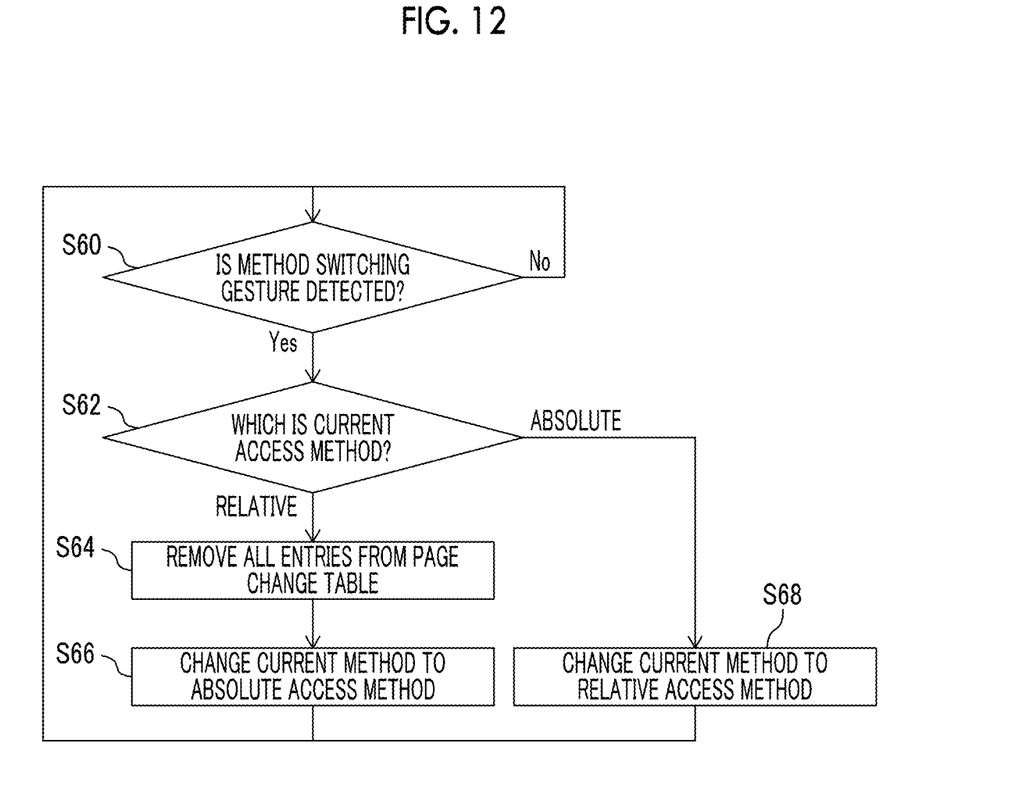
FIG. 12 is a diagram showing an example of a switching control procedure of the page turning method in the browsing device of FIG. 11.

FIG. 12 shows an example of a process procedure of the method switching unit 22. In this procedure, in a case where the gesture detection unit 20 detects the special gesture (the determination result of S60 is Yes), the method switching unit 22 determines whether the current page access method is the absolute access method or the relative access method (S62). In a case where the current method is the relative access method, the method switching unit 22 instructs the page turning determination unit 14 to reset (remove all the entries) the page change table 144 (see FIG. 4) (S64), and switches the access method to the absolute access method (S66). That is, the page turning determination unit 14 that is operated until now is paused, and the absolute access processing unit 24 that is paused until now is activated. In a case where it is determined that the current access method of S62 is the absolute access method, the method switching unit 22 changes the access method to the relative access method (S68). That is, the absolute access processing unit 24 that is operated until now is paused, and the page turning determination unit 14 that is paused until now is activated.

Figure 10:
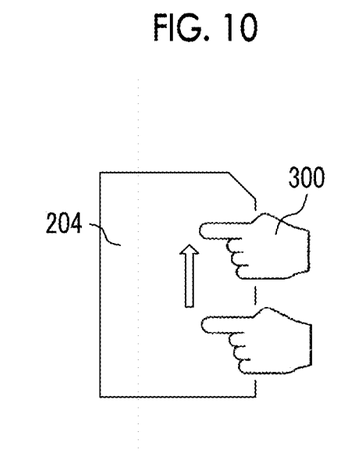
FIG. 10 is a diagram for describing an example of a gesture for instructing that a page turning method is to be switched.

Although FIGS. 10 to 12 show the examples in which the switching of the method from the relative access method to the absolute access method and the switching of the method from the absolute access method to the relative access method are instructed by the same gesture, these switching operations may be instructed by different gestures.

Although the instruction to switch the access method is received by the gesture captured by the camera 202 in the example of FIGS. 10 to 12, this example is merely an example. Instead, a method of instructing that the access method is to be switched by performing a touch operation or a button operation on the original display (for example, the tablet terminal or the head-mounted display) of the browsing device 10 may be used.

In S16 and S18 of the procedure of FIG. 7, the image code 102 within the captured image is searched, and the image code 102 is decoded, and it is determined that the page having the page number of the operation booklet 100 is opened if the information acquired through the decoding is the page number. Here, a process of searching the image code 102 (for example, QR code) from an arbitrary position on the image or a process of decoding the image code is a burden to the browsing device 10, as a corresponding processing load. In a case where an image code printed for another purpose on another sheet different from the operation booklet 100 is captured, it is not understood that the image code indicates which page number of the operation booklet 100 unless the image code is not decoded, and thus, the processing load may be burden. As a modification example for reducing such a processing load, a mark (for example, a circle of a specific color) having a processing load than that of the image code 102 in order to detect and recognize the page number may be added to the page of the operation booklet 100, in addition to the image code 102 indicating the page number. In the modification example, the page number detection unit 12 initially tries to detect the mark from the captured image, and detects and recognizes the image code 102 in a case where the mark is not able to be detected. In a case where the mark is not able to be detected, the page number detection unit does not detect and recognize the image code 102.

As one modification example related to the absolute access method, a specific application or content (hereinafter, abbreviated to "app and the like") may be associated with a specific page of the operation booklet 100, and the browsing device 10 may call the app and the like in a case where the page is opened. For example, the association of the page with the app and the like may be performed by adding identification information for specifying the app and the like to the image code 102 within the page in addition to the page number. Alternatively, another image code indicating the identification information of the app and the like may be added.

Here, if the specific page is opened, the app and the like are necessarily called, and thus, there are some cases where it is rather inconvenient. Thus, the browsing device 10 may call the app and the like corresponding to the page only for a case where the user opens the page and do a specific gesture.

A specific utilization scene of this modification example is as follows. As one example, the browsing device 10 activates a mail client application if the user opens a certain page of the operation booklet 100, and activates a schedule book application if the user turns another page. As another example, the image code 102 indicating a link to information of a date of schedule data of the user corresponding to the page and the page number is printed on each page of the schedule book by the schedule book as the operation booklet 100. If the user opens a certain page of the schedule book and does a specific gesture under the camera 202, the browsing device 10 activates the schedule book app (or a web browser), and displays the schedule data indicated by the link on the screen.

A keyword may be associated with the specific page of the operation booklet 100. In this example, if the user opens the page (and if the user does the specific operation such as the specific gesture), the browsing device 10 activates the web browser, accesses a specific search service, sends the keyword to a search service, and performs the search.

In the above-described exemplary embodiment, the system prints the image code 102 indicating the page number on the page of the operation booklet 100 and captures and recognizes the image code 102 by the camera 202, and thus, the opened page is specified. However, this method is merely an example.

As another example, a method of assigning a wireless tag that stores the information of the page number to the page of the operation booklet 100 and providing a tag reader on one cover of the operation booklet 100 may be used. A wireless tag of a page group positioned on a certain cover of the tag reader may be read by the reader in a state in which the operation booklet 100 is opened on a certain page and a wireless tag of a page group present on a reverse display may not be read by the reader by appropriating a communication distance between the wireless tag and the tag reader and arrangement positions of the wireless tag and the tag reader on the page and the cover. For example, if the wireless tag is assigned near an end of each page of the operation booklet 100 having an A5 size by using a wireless tag system having a communication distance having about several centimeters, such a relationship is established (A value mentioned herein is merely an example). In this example, the page number detection unit 12 may determine that a maximum value (in a case where the tag reader is provided on the front cover) or a minimum value (in a case where the tag reader is provided on the back cover) of the page number read by the tag reader is the number of the page turned by the user.

For example, in the modification example in which the wireless tag is used, a switch that switches the operation mode (the navigation mode or the non-navigation mode) of the browsing device 10 may be provided on the cover of the operation booklet 100 or the browsing device 10.

In both the method of the previously described modification example in which the wireless tag is used and the method of the above-described exemplary embodiment in which the image code 102 is used, each page explicitly includes the information of the page number. However, such an example is not necessarily required.

Even though each page does not explicitly include the information of the page number, if the front cover is able to detect the number of pages (the number of sheets) superposed onto the front cover (or the back cover), the number of the page currently opened may be specified from the number of pages. For example, a capacitance sensor may be provided on the front cover (or the back cover), the number of superposed pages may be determined from a change of a detection signal level of the sensor depending on the number of sheets superposed onto the front cover, and the number of the opened page from the number of pages determined may be specified.

For example, the browsing device 10 illustrated above is realized by causing a computer to execute programs indicating the above-described functions of the device. Here, for example, the computer has a circuit configuration in which a controller that controls a microprocessor such as a CPU, a memory (primary storage) such as a random-access memory (RAM) or a read-only memory (ROM), and a secondary storage device such as a flash memory, a solid-state device (SSD), or a hard disk drive (HDD), various input and output (I/O) interface, and a network interface that controls for connection with a network such as a local area network, as hardware, are connected through, for example, a bus. Programs that describe the processing contents of these functions are stored in the secondary storage device such as the flash memory via the network, and are installed on the computer. The functional module group illustrated above is realized by reading the program stored in the secondary storage device into in the RAM and executing the read program by using the processor such as the CPU.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A browsing control system comprising:
a booklet that is acquired by binding a number of sheets;
a specification unit that specifies a page number of a page opened in the booklet; and
a controller that controls page turning of an electronic document depending on a difference between a page number specified by the specification unit before the page of the booklet is turned and a page number specified by the specification unit after the page thereof is turned,
wherein the controller calculates the number of pages to be turned through the page turning of the electronic document by using a propagation function that defines the relationship between the difference and the number of pages to be turned through the page turning of the electronic document, and turns pages of the electronic document as many as the number of pages calculated.

2. The browsing control system according to claim 1, wherein the propagation function is a function that maps the total number of pages of the booklet to the number of pages which is equal to or greater than the total number of pages of the electronic document.

3. The browsing control system according to claim 2, wherein the propagation function is a function of which a slope monotonically increases with respect to the difference.

4. The browsing control system according to claim 3, wherein the propagation function is a value which satisfies that the number of pages to be turned is equal to the difference in a section in which the difference is equal to or less than a threshold.

5. The browsing control system according to claim 2, wherein the propagation function is a value which satisfies that the number of pages to be turned is equal to the difference in a section in which the difference is equal to or less than a threshold.

6. The browsing control system according to claim 2, wherein information indicating a page number corresponding to each sheet is retained in each sheet of the booklet, and
the specification unit specifies a page number of an opened page by reading the information of the page number retained in the sheet corresponding to the opened page.

7. The browsing control system according to claim 1,
wherein the propagation function is a function of which a slope monotonically increases with respect to the difference.

8. The browsing control system according to claim 7,
wherein the propagation function is a value which satisfies that the number of pages to be turned is equal to the difference in a section in which the difference is equal to or less than a threshold.

9. The browsing control system according to claim 1,
wherein the propagation function is a value which satisfies that the number of pages to be turned is equal to the difference in a section in which the difference is equal to or less than a threshold.

10. The browsing control system according to claim 7,
wherein information indicating a page number corresponding to each sheet is retained in each sheet of the booklet, and
the specification unit specifies a page number of an opened page by reading the information of the page number retained in the sheet corresponding to the opened page.

11. The browsing control system according to claim 1,
wherein the propagation function is a function which satisfies that the number of pages to be turned through the page turning of the electronic document is 1 in a case where a magnitude of the difference is 1 and satisfies that the number of pages to be turned through the page turning of the electronic document is greater than the difference in a case where the magnitude of the difference is greater than 1.

12. The browsing control system according to claim 1,
wherein the propagation function is a function which satisfies that the number of pages to be turned through the page turning of the electronic document becomes greater as a speed at which the page of the booklet is turned becomes higher.

13. The browsing control system according to claim 1,
wherein information indicating a page number corresponding to each sheet is retained in each sheet of the booklet, and
the specification unit specifies a page number of an opened page by reading the information of the page number retained in the sheet corresponding to the opened page.

14. The browsing control system according to claim 13,
wherein the information indicating the page number is printed on the page of the sheet of the booklet in a form of an image code,
a mark capable of being recognized with a processing load less than a processing load in a case where the image code is decoded is further represented on the page of the sheet, and
the specification unit detects the image code from a captured image, decodes the detected image code to specify the page number in a case where the mark is recognized from the captured image, and does not try to detect the image code from the image in a case where the mark is not able to be detected from the captured image.

15. The browsing control system according to claim 1,
wherein the controller changes a current mode of the browsing control system to a specific mode if a specific operation is received from a user, and does not turn the page of the electronic document depending on the difference even though the page of the booklet is turned until the specific mode is off.

16. The browsing control system according to claim 1,
wherein the controller uses, as a page turning method of the electronic document, a relative method of controlling the page turning of the electronic document depending on the difference and an absolute method of controlling the page turning of the electronic document such that the page having the page number of the electronic document corresponding to the page number specified by the specification unit is displayed, and switches the page turning method if a specific operation is received from a user.

17. The browsing control system according to claim 1,
wherein the controller has, as an aspect of the page turning, a function of moving a display range of the electronic document by a movement amount corresponding to the difference.

18. A browsing device comprising:
a specification unit that specifies a page number of a page opened in a booklet acquired by binding a plurality of sheets; and
a controller that controls page turning of an electronic document depending on a difference between a page number specified by the specification unit before the page of the booklet is turned and a page number specified by the specification unit after the page is turned,
wherein the controller calculates the number of pages to be turned through the page turning of the electronic document by using a propagation function that defines the relationship between the difference and the number of pages to be turned through the page turning of the electronic document, and turns pages of the electronic document as many as the number of pages calculated.

19. A browsing control system comprising:
a booklet that is acquired by binding a number of sheets;
a specification unit that specifies a page number of a page opened in the booklet; and
a controller that controls page turning of an electronic document depending on a difference between a page number specified by the specification unit before the page of the booklet is turned and a page number specified by the specification unit after the page thereof is turned,
wherein at a first mode, the controller controls the page turning of the electronic document depending on the difference, and after the first mode changes to the second mode, the controller does not turn the page of the electronic document when the difference arises from turning of the pages of the booklet until the second mode is off.

* * * * *